(12) United States Patent
Arcella et al.

(10) Patent No.: US 8,207,235 B2
(45) Date of Patent: Jun. 26, 2012

(54) PROCESS FOR STABILIZING FLUOROPOLYMER HAVING ION EXCHANGE GROUPS

(75) Inventors: Vincenzo Arcella, Milan (IT); Luca Cirillo, Milan (IT); Alessandro Ghielmi, Milan (IT); Luca Merlo, Montorfano (IT); Stefano Millefanti, Como (IT)

(73) Assignee: Solvay Solexis S.p.A., Bollate (MI) (IT)

( * ) Notice: Subject to any disclaimer, the term of this patent is extended or adjusted under 35 U.S.C. 154(b) by 551 days.

(21) Appl. No.: 12/445,420

(22) PCT Filed: Oct. 16, 2007

(86) PCT No.: PCT/EP2007/060986
§ 371 (c)(1),
(2), (4) Date: Apr. 13, 2009

(87) PCT Pub. No.: WO2008/046816
PCT Pub. Date: Apr. 24, 2008

(65) Prior Publication Data
US 2010/0087553 A1    Apr. 8, 2010

(30) Foreign Application Priority Data
Oct. 17, 2006    (EP) .................................. 06122422

(51) Int. Cl.
*C08J 5/22* (2006.01)
*B01J 39/20* (2006.01)

(52) U.S. Cl. .................... 521/27; 521/38; 525/326.2

(58) Field of Classification Search ............ 521/27, 521/38; 525/326.2
See application file for complete search history.

(56) References Cited

U.S. PATENT DOCUMENTS

| | | | |
|---|---|---|---|
| 3,242,218 A | 3/1966 | Miller | |
| 3,665,041 A | 5/1972 | Sianesi et al. | |
| 3,715,378 A | 2/1973 | Sianesi et al. | |
| 4,743,658 A * | 5/1988 | Imbalzano et al. | 525/326.4 |
| 2004/0242793 A1 | 12/2004 | Hiraga et al. | |
| 2006/0063903 A1* | 3/2006 | Kasahara et al. | 526/247 |
| 2007/0129500 A1 | 6/2007 | Honda et al. | |

FOREIGN PATENT DOCUMENTS

| | | |
|---|---|---|
| CA | 786877 A | 6/1968 |
| EP | 148482 A2 | 7/1985 |
| EP | 918060 A1 | 5/1999 |
| EP | 1256591 A1 * | 11/2002 |
| EP | 1256592 A1 | 11/2002 |
| EP | 1666508 A1 * | 6/2006 |
| GB | 1210794 A | 10/1970 |
| GB | 1226566 A | 3/1971 |
| WO | WO8912240 A1 | 12/1989 |
| WO | WO0192351 A2 | 12/2001 |
| WO | WO2005028522 A1 | 3/2005 |
| WO | WO2005037879 A1 | 4/2005 |

OTHER PUBLICATIONS

Standard ASTM D3418, Historical 2003, "Test Method for Transition Temperatures and Enthalpies of Fusion and Crystallization of Polymers by Differential Scanning Calorimetry", p. 1-7.
Pianca M. et al., "End groups in fluoropolymers", Journal of Fluorine Chemistry, 1999, vol. 95, p. 71-84, Elsevier Science S.A.
PCT International Search Report dated Dec. 27, 2007 for International Application No. PCT/EP2007/060986 (3 pp.).

* cited by examiner

*Primary Examiner* — Michael M Bernshteyn
(74) *Attorney, Agent, or Firm* — Arent Fox, LLP (57) ABSTRACT

The invention pertains to a process for stabilizing a semi-crystalline fluoropolymer comprising ion exchange groups, said process comprising:
  suspending at least one semi-crystalline fluoropolymer having ion exchange groups [polymer (I)] in at least one fluorinated organic dispersing medium [medium (M)] so as to obtain a dispersion (D) of polymer (I) in a dispersing medium (M);
  contacting said dispersion (D) with fluorine under irradiation with U.V. radiation so as to obtain a stabilized polymer.

Still objects of the invention are a stable semi-crystalline fluoropolymer as above defined having a low amount of unstable ends groups of —COF type, the use of the stabilized fluoropolymer obtained by the process or of the stable fluoropolymer in fuel cells devices, a membrane and a membrane-electrode assembly comprising said fluoropolymers.

10 Claims, 1 Drawing Sheet

PROCESS FOR STABILIZING FLUOROPOLYMER HAVING ION EXCHANGE GROUPS

CROSS-REFERENCE TO RELATED APPLICATIONS

The present application is a U.S. national stage application under 35 U.S.C. §371 of International Application No. PCT/EP2007/060986 filed Oct. 16, 2007, which claims the benefit of European Patent Application Serial no. 06122421.6 filed on Oct. 17, 2006, these applications being incorporated herein by reference in their entirety for all purposes.

TECHNICAL FIELD

Present invention pertains to a process for reducing unstable end groups in a fluoropolymer having ion exchange groups, to a stable fluoropolymer, to the use of such fluoropolymer in fuel cells devices, to membranes and membrane-electrode assemblies comprising said stable fluoropolymer.

BACKGROUND ART

Fuel cells, and in particular hydrogen-oxygen fuel cells, are currently drawing increasing attention as power generating systems possessing substantially no detrimental effect against the environment. In particular, polymer fuel cells have been identified as most promising approaches for implementing fuel cell technology as they enable obtaining higher power density.

The basic element of a polymer fuel cell is the so-called "membrane electrode assembly" (MEA). The MEA comprises a polymeric membrane which consists of a proton conducting polymer and whose opposing faces are in contact with electrically conductive and catalytically active layers (also called electrode layers). Said electrode layers catalyze the oxidation of the fuel and the reduction of the oxidizing agent, and contribute to assure the necessary electrical conductivity within the fuel cell. Such layers are generally composed of the same proton conducting polymer as the membrane containing dispersed therein an active catalyst, generally a noble metal (e.g. Pt).

Perfluorinated polymers having sulfonic groups have been widely used as materials both for the polymeric membrane and the electrode layers. Nevertheless, such polymers generally comprise unstable end-groups, e.g. of —COF type and/or other irregularities and/or defects in the chain, which, during fuel cells operation, behave as decomposition-sensible moieties. Thus, during long-term fuel cells operation, the polymer of the membrane and/or of the electrode layers gradually decomposes starting from above-mentioned weakness points; these decomposition phenomena lead to the decease of the mechanical strength of the membrane and/or of the MEA, might generate pinholes, breaking, abrasion and the like, so that the power generation voltage is progressively reduced and fuel cell life-time is limited.

It is generally understood that the degradation of the membranes and/or MEAs is induced by peroxide species derived from decomposition of hydrogen peroxide formed due to the inevitable gas crossover through the membrane. Perfluorinated polymers having sulfonic groups thus are known to decompose according to the so-called "unzipping reaction", wherein starting from —COF-type defects, generally hydrolized as —COOH groups, the main chain of the polymer progressively disaggregates following the reactions scheme sketched here below:

wherein $R_f$ represents the fluoropolymer chain.

In view of the above, stability and durability of fluoropolymers for fuel cells membranes and/or MEAs have been generally assessed with reference to Fenton tests, wherein the amount of fluoride ions released as a consequence of fluoropolymer treatment with hydrogen peroxide in the presence of iron (II) ions (catalyzing $H_2O_2$ decomposition in .OH radicals) is determined.

Several methods have been proposed in the past aiming at improving stability of fluoropolymers by reduction of defects and/or unstable end-group.

Patent Citation 0001: GB 1210794 (E.I. DUPONT DE NEMOURS AND COMPANY). 1970-10-28.

discloses a process for the stabilization of high molecular weight fluorocarbon polymers in the solid state (as particulate or pre-molding form or as molded articles) by contacting said polymers with a fluorine radical generating compound (e.g. gaseous fluorine) in the absence of oxygen. Among fluorocarbon polymers which can be stabilized according to the above-mentioned process, mention is notably made of fluorocarbon polymers having pendant —$SO_3H$ groups or precursors thereof.

Patent Citation 0002: US 2004242793 (DAIKIN). 2004-12-02.

discloses a process wherein olefinic (—CF=$CF_2$) and/or acyl fluoride (—COF) end groups of a fluorine-containing polymer (e.g. a tetrafluoroethylene/hexafluoropropylene copolymer) are converted in stable —$CF_2H$ moieties by heat treatment in the presence of moisture at temperatures exceeding 200° C. of mixtures of said copolymers with a basic compound chosen among alkali metal or alkaline earth metal base or ammonia.

Patent Citation 0003: U.S. Pat. No. 4,743,658 (E.I. DUPONT DE NEMOURS AND COMPANY). 1988-05-10.

discloses a process for the stabilization of tetrafluoroethylene/perfluoroalkylvinylether copolymers by fluorination of the same under the form of pellets by solid/gas reaction with fluorine gas.

Thus

Patent Citation 0004: US 2006063903 (ASAH GLASS COMPANY, LTD). 2006-03-23.

discloses a process for providing a perfluorinated polymer having sulfonic acid groups, wherein said polymer having precursors for said sulfonic acid groups (e.g. —$SO_2F$ moieties) is first submitted to a heat treatment, and then contacted with fluorine gas. The heat treatment is considered as a key step, as it enables conversion of unstable end groups in —COF moieties which can be easily converted in stable —$CF_3$ groups by contacting with fluorine gas, so that the polymer obtained therefrom, when contacted with hydrogen peroxide in well-defined conditions exhibits a fluorine ions release of less than 0.002% ('til down to 0.001%) of the total amount of fluorine in the polymer.

Nevertheless, these processes do not provide for a suitable method for substantially reducing the number of unstable groups/defects in fluoropolymers having ion exchange groups so that the stability and durability of membranes and/or MEAs thereof is acceptable for being used in fuel cells stacks. It is important to outline that even limited traces of unstable groups, e.g. detected by non-zero fluoride emission in Fenton tests, might substantially impair durability and power generation voltage of the cell. There is thus still a need in the art for a process for stabilization of fluoropolymers having ion-exchange groups which advantageously enables substantial elimination of unstable end-group, so that virtually no $F^-$ emission in Fenton test is detected.

Also it is known in the art a process for the stabilization of amorphous polymers.

Thus,

Patent Citation 0005: EP 1256591 A (AUSIMONT S.P.A.). 2002-11-13.

and

Patent Citation 0006: EP 1256592 A (AUSIMONT S.P.A.). 2002-11-13.

disclose a process for the stabilization of amorphous perfluorinated polymers, wherein said polymer is first dissolved in a suitable solvent so as to obtain a solution having a concentration of from 0.5 to 15% by weight, and then said solution is submitted to fluorination with elemental fluorine in the presence of UV radiation. Fluoropolymers stabilized according to such method are endowed with a substantial absence of unstable polar end groups, i.e. undetectable by FT-IR spectroscopy. Among amorphous stabilized fluoropolymers obtainable by means of this process, mention is notably made of copolymers comprising recurring units derived from fluorosulfonic monomers, e.g. $CF_2=CF-OCF_2-CF_2-SO_2F$, $CF_2=CF-O-[CF_2-CXF-O]_n-CF_2CF_2-SO_2F$, wherein X=Cl, F or $CF_3$ and n=1-10 and $CF_2=CF-OCF_2-CF_2-CF_2-SO_2F$.

Nevertheless this process has limited application because it requires the fluoropolymer to be solubilized in above mentioned solvents: while amorphous materials can be solubilized with success, semi-crystalline fluoropolymers having ion-exchange groups, which possess the required mechanical properties for being used in membranes and/or MEAs for fuel cells, do not solubilize in comparable conditions. Moreover, the process according to Patent Citation 0007: EP 1256591 A—.

and

Patent Citation 0008: EP 1256592 A—.

suffers of the disadvantages related to the burden of polymer recovery: in fact, recovery of stabilized fluoropolymer from the solution as above detailed requires onerous time- and energy-consuming procedures, such as, for instance, evaporation of the solvent and it is thus difficult to implement at the industrial level.

There is thus still a need in the art for a process for efficiently stabilizing fluoropolymers comprising ion exchange groups, which can efficiently works with materials which have no appreciable solubility and which is time- and cost-effective.

DISCLOSURE OF INVENTION

Is thus an object of the present invention a process for stabilizing a semi-crystalline fluoropolymer comprising ion exchange groups, said process comprising:

suspending at least one semi-crystalline fluoropolymer having ion exchange groups [polymer (I)] in at least one fluorinated organic dispersing medium [medium (M)] so as to obtain a dispersion (D) of polymer (I) in a dispersing medium (M);

contacting said dispersion (D) with fluorine under irradiation with U.V. radiation so as to obtain a stabilized polymer.

Another object of the invention is a stable semi-crystalline fluoropolymer having ion-exchange groups having a low amount of unstable ends groups of —COF type, wherein the amount of said unstable end groups is of less than 0.05 mmol/kg [polymer (F)].

Still another object of the invention is the use of the fluoropolymer obtained by the process as above described or the polymer (F) here above in fuel cells devices.

Still other objects of the invention are a membrane and a membrane-electrode assembly comprising said fluoropolymer obtained from the process of the invention or the polymer (F) as above detailed.

The Applicant has surprisingly found that the process of the invention enables efficient elimination of unstable end-groups and/or defects in fluoropolymers having ion exchange groups with no need of solubilization.

Thus, by dispersing the polymer (I) in a suitable dispersing medium, U.V. radiation assisted fluorination is effective in reducing the amount of unstable end-groups. Moreover, the process of the invention advantageously enables easy recovery of stabilized materials by simple separation techniques, e.g. decantation, filtration and the like.

Within the context of the present invention the mention "at least one fluoropolymer having ion exchange groups" is intended to denote one or more than one polymer (I). Mixtures of polymers (I) can be advantageously used for the purposes of the invention.

In the rest of the text, the expressions "fluoropolymer having ion exchange groups" and "polymer (I)" are understood, for the purposes of the present invention, both in the plural and the singular, that is to say that the process may be applied to one or more than one polymer (I).

To the purpose of the present invention, the term "fluoropolymer having ion exchange groups" is intended to denote any polymer comprising:

recurring units derived from at least one ethylenically unsaturated monomer comprising at least one fluorine atom (fluorinated monomer, hereinafter); and a substantial amount of recurring units derived from at least one ethylenically unsaturated monomer comprising at least one ion exchange group (functional monomer, hereinafter).

The term "at least one ethylenically unsaturated monomer comprising at least one fluorine atom [fluorinated monomer]" is understood to mean that the polymer (I) can comprise recurring units derived from one or more than one fluorinated monomer.

In the rest of the text, the expression "fluorinated monomer" is understood, for the purposes of the present invention, both in the plural and the singular.

The fluorinated monomer can further comprise one or more other halogen atoms (Cl, Br, I). Shall the fluorinated monomer be free of hydrogen atom, it is designated as per(halo)fluoromonomer. Shall the fluorinated monomer comprise at least one hydrogen atom, it is designated as hydrogen-containing fluorinated monomer.

Non limitative examples of fluorinated monomers are notably tetrafluoroethylene (TFE), vinylidene fluoride (VdF), chlorotrifluoroethylene (CTFE), and mixtures thereof.

Optionally, the fluoropolymer may comprise recurring units derived from one first monomer, said monomer being a fluorinated monomer as above described, and at least one other monomer [comonomer (CM), hereinafter].

Hereinafter, the term comonomer (CM) should be intended to encompass both one comonomer and two or more comonomers.

The comonomer (CM) can notably be either hydrogenated (i.e. free of fluorine atom) [comonomer (HCM), hereinafter] or fluorinated (i.e. containing at least one fluorine atom) [comonomer (FCM), hereinafter].

Non limitative examples of suitable hydrogenated comonomers (HCM) are notably ethylene, propylene, vinyl monomers such as vinyl acetate, acrylic monomers, like methyl methacrylate, acrylic acid, methacrylic acid and hydroxyethyl acrylate, as well as styrene monomers, like styrene and p-methylstyrene.

Non limitative examples of suitable fluorinated comonomers (FCM) are notably:

- $C_3$-$C_8$ fluoro- and/or perfluoroolefins, such as hexafluoropropene, penta-fluoropropylene, and hexafluoroisobutylene;
- $C_2$-$C_8$ hydrogenated monofluoroolefins, such as vinyl fluoride;
- 1,2-difluoroethylene, vinylidene fluoride and trifluoroethylene; perfluoroalkylethylenes complying with formula $CH_2=CH-R_{f0}$, in which $R_{f0}$ is a $C_1$-$C_6$ perfluoroalkyl;
- chloro- and/or bromo- and/or iodo-$C_2$-$C_6$ fluoroolefins, like chlorotrifluoroethylene;
- fluoroalkylvinylethers complying with formula $CF_2=CFOR_{f1}$ in which $R_{f1}$ is a $C_1$-$C_6$ fluoro- or perfluoroalkyl, e.g. $-CF_3$, $-C_2F_5$, $-C_3F_7$;
- fluoro-oxyalkylvinylethers complying with formula $CF_2=CFOX_0$, in which $X_0$ is a $C_1$-$C_{12}$ oxyalkyl, or a $C_1$-$C_{12}$ (per)fluorooxyalkyl having one or more ether groups, like perfluoro-2-propoxy-propyl;
- fluoroalkyl-methoxy-vinylethers complying with formula $CF_2=CFOCF_2OR_{f2}$ in which $R_{f2}$ is a $C_1$-$C_6$ fluoro- or perfluoroalkyl, e.g. $-CF_3$, $-C_2F_5$, $-C_3F_7$ or a $C_1$-$C_6$ (per)fluorooxyalkyl having one or more ether groups, like $-C_2F_5-O-CF_3$; fluorodioxoles, of formula:

wherein each of $R_{f3}$, $R_{f4}$, $R_{f5}$, $R_{f6}$, equal or different each other, is independently a fluorine atom, a $C_1$-$C_6$ fluoro- or per(halo)fluoroalkyl, optionally comprising one or more oxygen atom, e.g. $-CF_3$, $-C_2F_5$, $-C_3F_7$, $-OCF_3$, $-OCF_2CF_2OCF_3$.

The term "substantial amount" in the definition here above is intended to denote an amount of recurring units derived from the functional monomer which is effective to modify the polymer in its properties. Generally, a substantial amount is of at least 1% by moles, based on the total moles of recurring units.

As used herein, the term "ion exchange group" has its general meaning as intended in organic chemistry and it encompasses atoms or combination of atoms bonded to the carbon skeleton of the ethylenically unsaturated monomer, which confers to said ethylenically unsaturated monomer ability to trap and release (i.e. exchange) ions in a process called ion exchange.

Non limitative examples of ion exchange groups are notably those complying with formula:

—$SO_2X$, wherein X is chosen among halogens (Cl, Fl, Br, I), —$O^-M^+$, wherein $M^+$ is a cation selected among $H^+$, $NH_4^+$, $K^+$, $Li^+$, Na, or mixtures thereof.

—$PO_2Z$, wherein Z is chosen among halogens (Cl, Fl, Br, I); —$O^-M^+$, wherein $M_+$ is a cation selected among $H^+$, $NH_4^+$, $K^+$, $Li^+$, $Na^+$; —$OR_{Hy}$, wherein $R_{Hy}$ is a $C_1$-$C_6$ hydrocarbon group, and —$OR_{Hf}$, wherein $R_{Hf}$ is a $C_1$-$C_6$ fluorocarbon or per(halo)fluorocarbon group, or mixture thereof.

Preferably polymer (I) comprises sulfonic-type ion exchange groups, i.e. groups of formula —$SO_2X$, as above detailed. In such a case, it is advantageous, for the purpose of the invention, that the ion exchange groups of formula —$SO_2X$ of polymer (I) as above detailed are under the form of sulfonyl fluoride, i.e. under their —$SO_2F$ form (X=F) when polymer (I) is contacted with fluorine as above detailed. This form is stable in the fluorination conditions and no side-reaction is caused to occur; this also advantageously avoids release of highly corrosive HF which might otherwise generate when e.g. ion exchange groups are in their —$SO_3H$ form.

Should the functional monomer comprise [in addition to fluorine atoms optionally comprised in the functional group] at least one fluorine atom which is not comprised in the functional group, it is designated as fluorinated functional monomer. Should the functional monomer be free of fluorine atoms other than those optionally comprised in the functional group, it is designated as hydrogenated functional monomer.

The fluorinated monomer and the fluorinated functional monomer may be the same monomer or may be different monomers, that is to say that the functional fluoropolymer [polymer (I)] can be a homopolymer of a fluorinated functional monomer, or can be a copolymer of one or more than one fluorinated monomer and one or more than one functional monomer, fluorinated or hydrogenated.

Polymer (I) comprises advantageously at least 1%, preferably at least 2%, more preferably at least 3%, even more preferably at least 5%, by mole of recurring units derived from the functional monomer, based on the total moles of recurring units.

Polymer (I) comprise advantageously at most 75%, preferably at most 50%, more preferably at most 30%, even more preferably at most 20% by moles of recurring units derived from the functional monomer, based on the total moles of recurring units.

Preferably, the polymer (I) comprises recurring units derived from at least one fluorinated functional monomer chosen among:

(M1) sulfonated perfluoroolefin of formula (M1):

(M1)

wherein n is an integer between 0 and 6 and X' is chosen among halogens (Cl, Fl, Br, I), —$O^-M^+$, wherein $M^+$ is a cation selected among $H^+$, $NH_4^+$, $K^+$, $Li^+$, Na, or mixtures thereof; preferably X' is fluorine; preferred sulfonated fluoroolefin are those complying with formulae (M1-A) and (M1-B):

(M1-A)

(M1-B)

wherein X' has the same meaning as above defined;
(M2) sulfonated perfluorovinylethers of formula (M2):

(M2)

wherein m is an integer between 1 and 10 and X' is chosen among halogens (Cl, Fl, Br, I), —O$^-$M$^+$, wherein M$^+$ is a cation selected among H$^+$, NH$_4^+$, K$^+$, Li$^+$, Na, or mixtures thereof; preferably X' is fluorine; preferred are sulfonated perfluoroethers of formulae (M2-A), (M2-B) and (M2-C):

(M2-A)

(M2-B)

(M2-C)

wherein X' has the same meaning as above defined; most preferably, the sulfonated perfluorovinylether is perfluoro-5-sulphonylfluoride-3-oxa-1-pentene (also known as "SFVE") of formula (M2-D):

(M2-D)

which can be in its —SO$_2$F or in any of the —SO$_2$X' forms, as above detailed.
(M3) sulfonated perfluoroalkoxyvinylethers of formula (M3):

(M3)

wherein w is an integer between 0 and 2, RF$_1$ and RF$_2$, equal or different from each other and at each occurrence, are independently —F, —Cl or a C$_{1-10}$ perfluoroalkyl group, optionally substituted with one or more ether oxygens, y is an integer between 0 and 6 and X' is chosen among H, halogens (Cl, Fl, Br, I), —O$^-$M$^+$, wherein M$^+$ is a cation selected among H$^+$, NH$_4^+$, K$^+$, Li$^+$, Na, or mixtures thereof; preferably X' is fluorine; preferred sulfonated perfluoroalkoxyvinylether complies with formula (M3) here above, wherein w is 1, RF$_1$ is —CF$_3$, y is 1 and RF$_2$ is —F and X' is F [formula (M3-A), also called "PSEPVE" (perfluoro-2-(2-fluorosulfonylethoxy)propylvinyl ether)]:

(M3-A)

which can be in its —SO$_2$F or in any of the —SO$_2$X' forms, as above detailed.
(M4) sulfonated aromatic (per)fluoroolefins of formula (M4):

(M4)

wherein Ar is a C$_{3-15}$ aromatic or heteroaromatic moiety, preferably perfluorinated, and X' is chosen among halogens (Cl, Fl, Br, I), —O$^-$M$^+$, wherein M$^+$ is a cation selected among H$^+$, NH$_4^+$, K$^+$, Li$^+$, Na, or mixtures thereof; preferably X' is fluorine; and (M5) mixtures thereof.

Optionally, in addition to recurring units derived from fluorinated monomer(s) and functional monomer(s) as above specified, the polymer (I) can further comprise recurring units derived from at least one bis-olefin chosen among those of formulae:

(OF-1)

wherein j is an integer between 2 and 10, preferably between 4 and 8, and R1, R2, R3, R4, equal or different from each other, are H, F or C$_{1-5}$ alkyl or (per)fluoroalkyl group;

(OF-2)

wherein each of A, equal or different from each other and at each occurrence, is independently selected from F, Cl, and H; each of B, equal or different from each other and at each occurrence, is independently selected from F, Cl, H and $OR_B$, wherein $R_B$ is a branched or straight chain alkyl radical which can be partially, substantially pr completely fluorinated or chlorinated; E is a divalent group having 2 to 10 carbon atom, optionally fluorinated, which may be inserted with ether linkages; preferably E is a —$(CF_2)_m$— group, with m being an integer from 3 to 5; a preferred bis-olefin of (OF-2) type is $F_2C=CF-O-(CF_2)_5-O-CF=CF_2$.

(OF-3)

wherein E, A and B have the same meaning as above defined; R5, R6, R7, equal or different from each other, are H, F or $C_{1-5}$ alkyl or (per)fluoroalkyl group.

Should the polymer (I) comprise recurring units derived from a bis-olefin as above defined, it advantageously comprises said recurring units in an amount in the range from 0.01 to 5% by moles, with respect to all recurring units of polymer (i).

Preferably, polymer (I) is free from bis-olefins as above described.

The polymer (I) is preferably a functional per(halo)fluoropolymer.

For the purpose of the invention, the term "functional per(halo)fluoropolymer" is intended to denote a functional fluoropolymer substantially free of hydrogen atoms.

The term "substantially free of hydrogen atom" is understood to mean that the functional per(halo)fluoropolymer consists essentially of:

recurring units derived from one or more than one ethylenically unsaturated monomer comprising at least one fluorine atom and free from hydrogen atoms (per(halo)fluoromonomer, hereinafter); and recurring units derived from one or more than one ethylenically unsaturated monomer comprising at least one fluorine atom and at least one cation exchange group, and free from hydrogen atoms (except those optionally comprised in the cation exchange group) (functional per(halo)fluoromonomer, hereinafter).

The per(halo)fluoromonomer and the functional per(halo)fluoromonomer may be the same monomer or may be different monomers, that is to say that the functional per(halo)fluoropolymer can be a homopolymer of a functional per(halo)fluoromonomer, or can be a copolymer of one or more than one per(halo)fluoromonomer and one or more than one functional per(halo)fluoromonomer.

Preferred polymer (I) is chosen among functional per(halo)fluoropolymers comprising (preferably consisting essentially of) recurring units derived from at least one functional per(halo)fluoromonomer and at least one per(halo)fluoromonomer chosen among:

$C_3$-$C_8$ perfluoroolefins, preferably tetrafluoroethylene (TFE) and/or hexafluoropropylene (HFP);

chloro- and/or bromo- and/or iodo-$C_2$-$C_6$ per(halo)fluoroolefins, like chlorotrifluoroethylene (CTFE) and/or bromotrifluoroethylene;

perfluoroalkylvinylethers (PAVE) complying with formula $CF_2=CFOR_{f1}$ in which $R_{f1}$ is a $C_1$-$C_6$ perfluoroalkyl, e.g. —$CF_3$, —$C_2F_5$, —$C_3F_7$;

perfluoro-oxyalkylvinylethers complying with formula $CF_2=CFOX_0$, in which $X_0$ is a $C_1$-$C_{12}$ perfluorooxyalkyl having one or more ether groups, like perfluoro-2-propoxy-propyl.

More preferred polymer (I) is chosen among tetrafluoroethylene (TFE) copolymers comprising (preferably consisting essentially of) recurring units derived from at least one functional per(halo)fluoromonomer as above defined.

Preferred functional per(halo)fluoromonomers are notably sulfonated perfluorovinylethers of formula (M2) as above detailed and sulfonated per-fluoroalkoxyvinylethers of formula (M3) as above detailed, and mixtures thereof.

Very good results have been obtained when the polymer (I) is selected among TFE copolymers comprising recurring units derived from PSEPVE and/or SFVE, in their —$SO_2F$ or —$SO_2X''$ form, wherein $X''$ is chosen among halogens (Cl, Br, I), —$O^-M^+$, wherein $M^+$ is a cation selected among $H^+$, $NH_4^+$, $K^+$, $Li^+$, Na, or mixtures thereof; preferably in their —$SO_2F$ form.

Still more preferred polymer (I) is selected among TFE copolymers comprising (preferably consisting essentially of):

from 5 to 20% by moles of recurring units derived from PSEPVE and/or SFVE, in their —$SO_2F$ or —$SO_2X''$ form, wherein $X''$ is chosen among halogens (Cl, Br, I), —$O^-M^+$, wherein $M^+$ is a cation selected among $H^+$, $NH_4^+$, $K^+$, $Li^+$, $Na^+$, or mixtures thereof; preferably in its —$SO_2F$; and from 95 to 80% by moles of recurring units derived from TFE.

According to a more preferred embodiment of the invention, polymer (I) is a tetrafluoroethylene (TFE) copolymer comprising (preferably consisting essentially of) recurring units derived from at least one functional per(halo)fluoromonomer of formula (M2) as above described. Preferred polymers (I) are TFE copolymers comprising (preferably consisting essentially of):

from 5 to 20% by moles of recurring units derived from at least one functional per(halo)fluoromonomer of formula (M2), in its —$SO_2F$ or —$SO_2X''$ form, wherein $X''$ is chosen among halogens (Cl, Br, I), —$O^-M^+$, wherein $M^+$ is a cation selected among $H^+$, $NH_4^+$, $K^+$, $Li^+$, $Na^+$, or mixtures thereof; preferably in its —$SO_2F$ form; and from 95 to 80% by moles of recurring units derived from TFE.

According to a most preferred embodiment of the invention, the polymer (I) is chosen among TFE copolymers as above described wherein the functional monomer is SFVE, in its —$SO_2F$ or —$SO_2X''$ form, wherein $X''$ is chosen among halogens (Cl, Br, I), —$O^-M^+$, wherein M is a cation selected among $H^+$, $NH_4^+$, $K^+$, $Li^+$, $Na^+$, or mixtures thereof; preferably in its —$SO_3H$ form.

The term semi-crystalline is intended to denote a polymer (I) which possesses a detectable melting point. It is generally understood that a semi-crystalline polymer (I) possesses a heat of fusion determined according to ASTM D 3418 of advantageously at least 0.4 J/g, preferably of at least 0.5 J/g, more preferably of at least 1 J/g.

To the purpose of the invention it is essential for the polymer (I) to be semi-crystalline; polymers which are not semi-crystalline as above described do not generally possess suitable mechanical properties for being used in membranes and/or MEAs for fuel cells; moreover, polymers which possess no melting point and/or a heat of fusion of less than 0.4 J/g are generally prone to dissolve in the process conditions, thus complicating polymer work-up after U.V. assisted fluorination.

Particularly good results have been obtained when the polymer (I) had a heat of fusion of from 4 to 8 J/g. Polymers (I) complying with such requirement were found to well behave in the process of the invention, thus efficiently providing for stabilized polymers particularly suitable to be used in fuel cells.

The polymer (I) has an equivalent weight (EW) of advantageously at least 650 g/eq, preferably at least 700 g/eq, more preferably at least 750 g/eq.

The polymer (I) has an equivalent weight of advantageously at most 1500 g/eq, preferably at most 1200 g/eq, more preferably at most 1000 g/eq.

When the polymer (I) comprises recurring units derived from SFVE, the selection of EW in the range between 950 and 850 g/eq is particularly advantageous for the purpose of obtaining a good ionic conductivity and valuable mechanical properties and thermal resistance.

The polymer (I) is preferably used in the process of the invention under the form of powder. The term powder is understood according to its current meaning to denote discrete solid particles.

When the polymer (I) is under the form of a powder, it generally has an average particle size of 1 to 1000 μm, preferably from 5 to 500 μm, most preferably from 20 to 200 μm.

When the average particle size of the powder of polymer (I) is below 1 μm, recovery of the polymer (I) from the medium (M) after fluorination becomes difficult and standard decantation and/or filtration procedures are not effective.

When the average particle size of the powder of polymer (I) exceeds 1000 μm, optical pathway of U.V. radiation through the polymer (i) material increases, so that a substantial amount of radiation is adsorbed before reaching the core of the powder particles: thus effectiveness of U.V. assisted fluorination is reduced.

Excellent results in terms of both easiness of separation, efficient dispersion in medium (M) and efficiency of fluorination were obtained when the polymer (I) possessed an average particle size from 20 to 200 μm.

Selection of this range of particle size is particularly advantageous with the aim of maximizing penetration of U.V. radiation (and thus effectiveness of fluorination) and still having a material easy to handle and which do not generate difficulties of separation.

Generally, the polymer (I) to be submitted to the process is obtained from an emulsion polymerization process, followed by coagulation.

Thus, the polymer (I) is generally submitted to the process as coagulum from emulsion polymerization. Pre-treatments such as purification from emulsifier, washing from contaminants, drying and the like can be performed on such coagulum before submitting it to the process of the invention.

The fluorinated organic dispersing medium [medium (M)] suitable for the process of the invention is not particularly limited provided that it does not solubilize the polymer (I) in the fluorination conditions and it is stable in such fluorination conditions.

Non limitative examples of dispersing media suitable in the process of the invention are notably perfluoroalkanes, perfluoropolyethers, and tertiary perfluoroamines. Such dispersing media advantageously enable optimal penetration and diffusion of U.V. radiation and generally do not undergo undesirable side reactions with fluorine.

The medium (M) is preferably chosen among:

(1) perfluoropolyethers of formula:

wherein:

X is equal to —F or —$CF_3$;

B and B', equal to or different from each other, are selected from —$CF_3$, —$C_2F_5$ or —$C_3F_7$;

b1' and b2', equal or different from each other, are independently integers $\geq 0$; should b1' and b2' be both different from zero, the different recurring units are generally statistically distributed along the chain.

Said products can be notably obtained by photooxidation of the hexafluoropropylene as described in Patent Citation 0009: CA 786877 (MONTEDISON S.P.A.). 1968-04-06. , and by subsequent conversion of the end groups as described in Patent Citation 0010: GB 1226566 (MONTECATINI EDISON S.P.A.). 1971-03-31. or can be prepared by ionic hexafluoropropylene epoxide oligomerization and subsequent treatment with fluorine as described in Patent Citation 0011: U.S. Pat. No. 3,242,218 (DU PONT). 1966-03-22.

(2) perfluoropolyethers of formula:

wherein

X is equal to —F or —$CF_3$;

C' and C", equal to or different from each other, are selected from —$CF_3$, —$C_2F_5$ or —$C_3F_7$;

c1', c2' and c3' equal or different from each other, are independently integers $\geq 0$; should at least two of c1', c2' and c3' be different from zero, the different recurring units are generally statistically distributed along the chain.

Said products can be manufactured by photooxidation of a mixture of $C_3F_6$ and $C_2F_4$ and subsequent treatment with fluorine as described in Patent Citation 0012: U.S. Pat. No. 3,665,041 (MONTEDISON SPA). 1972-05-23.

(3) perfluoropolyethers of formula:

wherein

D and D', equal to or different from each other, are selected from —$CF_3$, —$C_2F_5$ or —$C_3F_7$ d1' and d2' equal or different from each other, are independently integers $\geq 0$; should d1' and d2' be both different from zero, the different recurring units are generally statistically distributed along the chain.

Said products can be produced by photooxidation of $C_2F_4$ as reported in Patent Citation 0013: U.S. Pat. No. 3,715,378 (MONTEDISON SPA). 1973-02-06.

and subsequent treatment with fluorine as described in

Patent Citation 0014: U.S. Pat. No. 3,665,041 (MONTEDISON SPA). 1972-05-23.

(4) perfluoropolyethers of formula:

wherein
G and G', equal to or different from each other, are selected from —CF$_3$, —C$_2$F$_5$ or —C$_3$F$_7$
g1', g2', and g'3 equal or different from each other, are independently integers ≧0; generally g2' and g3' being zero; should at least two of g1', g2' and g3' be different from zero, the different recurring units are generally statistically distributed along the chain.

Said products may be prepared by ring-opening polymerizing 2,2,3,3-tetrafluorooxethane in the presence of a polymerization initiator to give a polyether comprising repeating units of the formula: —CH$_2$CF$_2$CF$_2$O—, and optionally fluorinating and/or chlorinating said polyether, as detailed in
Patent Citation 0015: EP 148482 A (DAIKIN INDUSTRIES). 1985-07-17.

Perfluoropolyethers particularly suitable as media (M) in the process of the invention are those commercially available under the trade mark GALDEN® from Solvay Solexis S.p.A.

It is thus understood that the dispersing medium [medium (M)] does not substantially comprise solubilized polymer (I). Thus, when the dispersion (D) is submitted to liquid/solid separation for recovering medium (M) and the stabilized polymer, said medium (M) is advantageously substantially free from polymer (I) or its corresponding stabilized polymer, that is to say that its dissolved solids content is advantageously of less than 0.1% wt, preferably of less than 0.01% wt. Dissolved solids content can be advantageously determined by evaporating to dryness dispersing medium (M) and weighting so-obtained solid residue.

According to the process of the invention, the dispersion (D) is contacted with fluorine; fluorine gas is generally used, but other compounds able to generate fluorine radicals can be suitable. As reactions involving fluorine radicals are generally very exothermic, it is preferred to dilute fluorine gas with an inert gas, e.g. nitrogen.

The term U.V. radiation is intended to denote, to the purpose of the invention, electromagnetic radiation with a wavelength shorter than that of visible light, but longer than soft X-rays. It can be subdivided into near U.V. (380-200 nm wavelength; abbreviation: NUV), far or vacuum U.V. (200-10 nm; abbreviation: FUV or VUV), and extreme U.V. (1-31 nm; abbreviation: EUV or XUV). NUV having wavelength from 200 to 380 nm is preferred in the process of the invention. Either monochromatic or polychromatic radiation can be used.

U.V. radiation can be provided in the process of the invention by any suitable U.V. radiation source. Preferred U.V. radiation source for the process of the invention is mercury lighting. It is known that a significant portion of the energy radiated from excited mercury vapours is in the ultra violet part of the spectrum. In the case of the low pressure discharge, more than half of the total energy supplied is radiated in the short-wave UV region at 253.7 nm. High pressure lamps radiate about 10% of their energy in the long-wave UV region at 365.0 nm, but an appreciable amount is also radiated at shorter wavelengths.

Temperature and pressure of the process are not critical, provided that the medium (M) remains in the liquid state in the operating conditions.

Generally a temperature comprised between 0 and 150° C. is suitable; preferably temperature will be chosen in the range from 20 to 100° C.

Pressures from 1 bar to 20 bar can be operated; preferably pressures of few bars are preferred as operations in such conditions do not require special high pressure reactors which shall in addition be at least partially transparent to U.V. radiation, fluorination being still effective. Thus pressure is generally kept between 1 and 3 bars.

The process of the invention can comprise additional steps, including recovery of the stabilized polymer from the dispersion (D).

Recovery of the stabilized polymer can be realized according to standard liquid/solid separation technologies well-known to those skilled in the art.

Preferably, the stabilized polymer is recovered from the dispersion by at least one of decantation and filtration.

Generally, the stabilized polymer is submitted to an additional drying step for eliminating residues of dispersing medium (M).

Drying can be accomplished according to standard procedures, e.g. in ventilated oven or in systems operating under vacuum.

The skilled in the art will select the suitable drying device as a function of the medium (M) to be eliminated from the stabilized polymer.

Another object of the invention is a stable semi-crystalline fluoropolymer having ion exchange groups having a low amount of unstable ends groups of —COF type, wherein the amount of said unstable end groups is of less than 0.05 mmol/kg [polymer (F)].

The stable semi-crystalline fluoropolymer having ion-exchange groups of the invention [polymer (F)] possesses all features as above described for polymer (I).

Said stable semi-crystalline fluoropolymer of the invention can be advantageously obtained by the process of the invention. Nevertheless, any other process can be suitable for producing polymer (F) of the invention, provided that the amount of unstable ends groups of —COF type is of less than 0.05 mmol/kg.

To the purposes of the invention, the term "unstable end groups of —COF type" is intended to encompass fluoroacyl groups and derivatives thereof, such as —COW groups, wherein W represent Cl, Br, NH$_2$, OM, with M being a hydrogen atom or a metal, preferably H or an alkaline metal.

The amount of unstable —COF-type end groups can be notably determined by FT-IR spectrometry, according to the method detailed here below (see examples section).

As the above mentioned method is endowed with a detection limit of 0.05 mmol/kg, when the stable semi-crystalline fluoropolymer having ion-exchange groups of the invention [polymer (F)] is submitted to such determination, practically no —COF-type end groups is detected, that is to say that polymer (F) is virtually free from any unstable —COF-type end groups.

The stable polymer (F) is preferably provided in its acid form. The term "acid form" of the fluoropolymer having ion-exchange groups should be understood to designate the form wherein the ion exchange groups possess bound thereto hydrogen cations (H$^+$). Whereas the ion exchange group comprises a sulfonic group of formula —SO$_2$X as above detailed, it is under its —SO$_3$H form.

The stable polymer (F) of the invention advantageously exhibit a release of fluoride anion, when submitted to a Fenton test wherein a sample of polymer (F) in its acid form is contacted for 16 hours at 40° C. with an aqueous solution of 3% hydrogen peroxide comprising 200 ppm of bivalent iron ions, of less than 7.5×10$^{-4}$% with respect to the total amount of fluorine of the polymer (F).

Fenton test as above detailed is described in
Patent Citation 0016: US 2006063903 (ASAH GLASS COMPANY). 2006-03-23.

The Applicant has surprisingly found that polymer (F) endowed with a fluoride anions release in above mentioned conditions of less than 0.00075% with respect to the total fluorine amount of polymer (F) advantageously possesses a substantially increased durability in fuel cells operations with respect to the materials described in above mentioned
Patent Citation 0017: US 2006063903 (ASAH GLASS COMPANY). 2006-03-23.

Thus, for a stable semi-crystalline fluoropolymer having ion-exchange groups, even a small reduction in fluoride anions release in said Fenton test (e.g. as small as 25%) is of significant value from an industrial point of view, as it enables substantially increasing endurance of membranes therefrom (e.g. significantly increasing endurance in OCV tests).

Preferably the stable polymer (F) of the invention exhibits a release of fluoride anion, when submitted to a Fenton test as above detailed of less than $7.0 \times 10^{-4}$% with respect to the total amount of fluorine of polymer (F).

As the detection limit for released fluorine anions in Fenton as above described test is very close to $7.0 \times 10^{-4}$% ($F^-$ on total fluorine), it should be understood that very preferably the stable polymer (F) yields no detectable fluoride release, when submitted to the Fenton test as above defined.

According to a preferred embodiment of the invention, it is provided a stable polymers (F) which possess nearly zero (i.e. non detectable) amount of unstable end-groups of —COF type and which lead to substantially no fluoride ($F^-$) release in Fenton test. Polymers (F) as detailed possess a tremendous potential in fuel cells, as they are proven to not undergo peroxide degradation phenomena which are generally recognized in the art as major source of failure of membrane and/or MEAs and as they possess significantly increased durability in fuel cells operations.

Still another object of the invention is the use of the stabilized semi-crystalline fluoropolymer comprising ion exchange groups obtained by the process as above described or the stable polymer (F) here above in fuel cells devices.

Such polymer can be used either as component of a membrane or in electrode layers or in the whole membrane-electrode assembly.

Thus, still other objects of the invention are a membrane and a membrane-electrode assembly comprising the stabilized semi-crystalline fluoropolymer comprising ion exchange groups obtained by the process as above described or the stable polymer (F) detailed above.

The membrane of the invention comprising the stabilized semi-crystalline fluoropolymer comprising ion exchange groups obtained by the process as above described or the stable polymer (F) of the invention can be produced by standard techniques well-known to those skilled in the art, e.g. by extrusion, casting and/or im-pregnation of pre formed support.

The MEAs of the invention comprising the stabilized semi-crystalline fluoropolymer comprising ion exchange groups obtained by the process as above described or the stable polymer (F) of the invention can be produced by standard techniques well-known to those skilled in the art; for instance a paste or ink comprising the stabilized semi-crystalline fluoropolymer comprising ion exchange groups obtained by the process as above described or the stable polymer (F) of the invention and a suitable metal catalyst (e.g. Pt) is casted on a membrane as above described.

Otherwise a multilayer extrusion process can be carried out so as to co-extrude the membrane and the electrodes layers.

The present invention will be now described in more details by reference to the following examples, whose purpose are merely illustrative and do not limit the scope of the present invention.

EXAMPLES

Determination of Unstable End-Groups of —COF-Type

A polymer (F) sample, submitted to a preliminary drying at 90° C. until constant weight, is compression moulded into a film having an average thickness between 50 and 300 μm. An FT-IR spectrum between 4000 $cm^{-1}$ and 400 $cm^{-1}$ is recorded, e.g. by using a Nicolet® Nexus FT-IR equipment (256 scannings, resolution 2 $cm^{-1}$), from said film.

The optical densities of absorption bands in the spectral region between 1900 and 1700 $cm^{-1}$ are measured and converted into values expressed as mmol/kg of polymer (F) using the extinction coefficients reported in Table 1, page 73 of the report by Non Patent Citation 0001: PIANCA, M. End groups in fluoropolymers. *J. Fluorine Chem.*, 1999 vol. 95, p. 71-84.

The sensitivity limit of this method is 0.05 mmol/Kg.

Fenton Test Protocol:

For assessing resistance of fluoropolymer having ion exchange groups against chemical attacks by peroxide species, a test sample was submitted to the procedure described in
Patent Citation 0018: US 2006063903 (ASAH GLASS COMPANY). 2006-03-23.

Thus, a specimen of roughly 0.1 g of the fluoropolymer having ion exchange groups, in its acid form (e.g. a specimen cut off from a membrane), was exposed for 16 hours at 40° C. to a solution of $H_2O_2$ at 3% containing 200 ppm of $Fe^{2+}$ cations. The fluoride content of the solution was then quantified via ion chromatography and expressed in percentage of eluted fluoride anions ($F^-$) on the total amount of fluorine of the tested material.

Example 1

Subsection (a) Emulsion Polymerization

In a 22 liters autoclave the following reagents were charged:

11.5 liters of demineralised water;

980 g of the monomer with formula: $CF_2$=CF—O—$CF_2CF_2$—$SO_2F$ 3100 g of a 5% weight solution of $CF_2ClO(CF_2CF(CF_3)O)_n(CF_2O)_mCF_2COOK$ in water with an average molecular weight of 521 and the ratio n/m=10.

The autoclave, stirred at 540 rpm, was heated to a temperature of 60° C. An aqueous solution containing 6 g/liter of KPS (potassium persulfate) was added in a quantity of 150 ml. The pressure was maintained at a value of 13.5 Bar (absolute pressure) by adding gaseous TFE.

After adding 1000 g of TFE in the reactor, 175 g of the monomer $CF_2$=CF—O—$CF_2CF_2$—$SO_2F$ were added. Then, sulfonated comonomer was added stepwise following TFE consumption: thus, 175 g of the monomer $CF_2$=CF—O—$CF_2CF_2$—$SO_2F$ were added every 200 g of TFE fed to the autoclave.

The reaction was interrupted after 233 min by stopping the stirring, cooling down the autoclave and reducing the internal pressure by venting the TFE; a total of 4000 g of TFE were fed.

The latex was kept under nitrogen bubbling for 16 hours to strip away residual monomers from the polymerization, and then stored in a plastic tank. The produced latex was found to possess a concentration of 28.5% by weight of solids.

Said latex was coagulated by freezing and thawing and the recovered coagulated polymer powder was washed with water and dried for 40 h at 150° C.; roughly 6 kg of a semi-crystalline fluoropolymer having —$SO_2F$ functional groups [polymer (I)] was obtained. Said polymer powder was found to possess a heat of fusion of 6.3 J/g and an average particle size of 120 μm.

(b) Determination of the Equivalent Weight (EW)

An aliquot of the dry polymer was compression moulded to yield a film in a press by heating the powder at 270° C. for 5 min. A square specimen having dimension 10×10 cm was cut of from said film and treated for 24 h in a KOH solution in water (10% by weight). After washing with pure water, the square specimen was treated with a 20% by weight $HNO_3$ solution at room temperature. The film was finally washed with water. The polymer was in this way converted from the precursor (—$SO_2F$) form to the acid (—$SO_3H$) form.
After drying in vacuum at 150° C., the film was titrated with diluted NaOH. The equivalent weight of the polymer was found to be 870 g/eq.

(c) Determination of Unstable End-Groups

A small amount of the semi-crystalline polymer from example 1 (3.5 mg) was compression moulded under a press and a sheet having a 5 mm diameter and 100 μm thickness is prepared. The spectrum from 4000 to 400 $cm^{-1}$ was recorded using a Nicolet® Nexus FT-IR equipment to determine the optical densities related to the end groups. Sample was found to possess 14 mmol/kg of unstable end-groups of —COF type.

Comparative Example 2

Production of a Membrane from Non-Stabilized Polymer of Example 1

Part of the polymer obtained according to example 1 was extruded using a Brabender conical twin screw extruder, at a head temperature corresponding to roughly five degrees more than the final melt temperature as determined from DSC analysis, so as to obtain pellets. Some of the pellets were hot pressed at 270° C. for 5 minutes to obtain a film having a thickness of 90±5 μm.

The film was then hydrolyzed to obtain a perfluorosulfonic acid membrane according to the following procedure:
1. treatment in aqueous KOH (10% wt) solution at a temperature of 80° C. for a total time of 4 hours
2. rinsing in demineralised water at ambient temperature (25° C.)
3. treatment in aqueous $HNO_3$ (20% wt) solution at room temperature (25° C.) for 1 hour
4. rinsing in demineralised water at ambient temperature (25° C.)

The thickness of the hydrolyzed membrane in its —$SO_3H$ form with formula $(C_2F_4)_n(C_4F_7O_4SH)_m$ was found to be 100±5 microns.

A specimen from said hydrolyzed membrane was submitted to the Fenton test as previously described and was found to release an amount of fluoride anions of $3.7 \times 10^{-2}$% ($F^-$ released on total fluorine).

Comparative Example 3

Solid Phase Fluorination of Polymer from Example 1 and Production of a Membrane Therefrom Part of the pellets obtained as described in Comparative example 2 were loaded in a glass reactor and dried for 3 hours under dry helium fed at a feed rate of 2 Nl/h at 100° C., in order to eliminate the residual moisture. The temperature in the reactor was kept at the set-point by using a thermostatic bath. Then a mixture 1:1 by volume of nitrogen/fluorine (2 Nl/h) was fed into the glass reactor kept at 80° C. Fluorination was monitored by subsequent samplings at different reaction times; after 12 hours of reaction, residual end groups were found to reach a plateau close to 4.5 mmol/kg, and no significant further reduction was achieved by increasing reaction time. Thus, after 16 hours, residual fluorine was removed under vacuum and 5 Nl/h of nitrogen were fed during 3 hours. A sample of the so treated polymer in pellets was checked by FT-IR analysis to determine the residual unstable end groups. The total amount of residual unstable end groups of —COF type was found to be 4.3 mmol/kg, and in particular 0.8 mmol/kg polymer for —COF moieties and 3.5 mmol/kg polymer for COOH moieties.

The so fluorinated polymer was hot pressed at 270° C. for 5 minutes to obtain a film having a thickness of 90 μm. The film was hydrolyzed as above described in comparative example 2, to yield a membrane.

A specimen from said hydrolyzed membrane was submitted to the Fenton test as previously described and was found to release an amount of fluoride anions of $3.3 \times 10^{-3}$% ($F^-$ released on total fluorine).

Example 4

Dispersion Phase Fluorination of Polymer from Example 1 and Production of a Membrane Therefrom 500 g of a 3% wt polymer (I) dispersion was prepared by suspending 15 grams of polymer from example 1 in Galden® D80 perfluoropolyether. Said dispersion was introduced into a 300 ml photochemical glass reactor equipped with mechanical stirrer, cooling shell and mercury vapour UV immersion lamp (Haereus 150 W). A mixture 1:1 by volume of nitrogen/fluorine gases (2 Nl/h) was fed into the glass reactor under U.V. irradiation for 10 h at 25° C. Then, residual fluorine was vented and stabilized polymer was recovered.

A sample of the stabilized polymer was analyzed by FT-IR to determine the residual unstable end-groups. The total amount of residual end groups of —COF type was found to be less than 0.05 mmol/kg polymer.

The stabilized fluoropolymer was hot pressed at 270° C. for 5 minutes to obtain a film having a thickness of 90 μm. The film was hydrolyzed as described in comparative example 2, to yield a membrane.

A specimen from said hydrolyzed membrane was submitted to the Fenton test as previously described and was found to release an amount of fluoride anions of less than $7.0 \times 10^{-4}$% ($F^-$ released on total fluorine).

Example 5 to 7

Evaluation of Fuel Cell BOL (Beginning of Life) Performances of Membranes of Comparative Examples 2 and 3 and of Example 4

The membrane produced in example 2 was assembled in a single cell (Fuel Cell Technology®) with an active area of 25 cm² and tested on a Arbin® 50W test stand. The membrane was assembled using commercially available E-TEK® LT250EW gas diffusion electrodes with 0.5 mg/cm² Pt treated with NAFION® polymer on the surface.

Similar assemblies were prepared using the membrane of comparative example 3 and of example 4.

Polarization curves in the following operating conditions were recorded (for each membrane):
Reactants stoichiometry: 2.8 Air-3.4 Hydrogen (pure hydrogen 5.5 grade);
Reactant humidity level: 100%
Cell temperature: 75° C.
Operating pressure: 2.5 Bar Abs.

Figure 1:
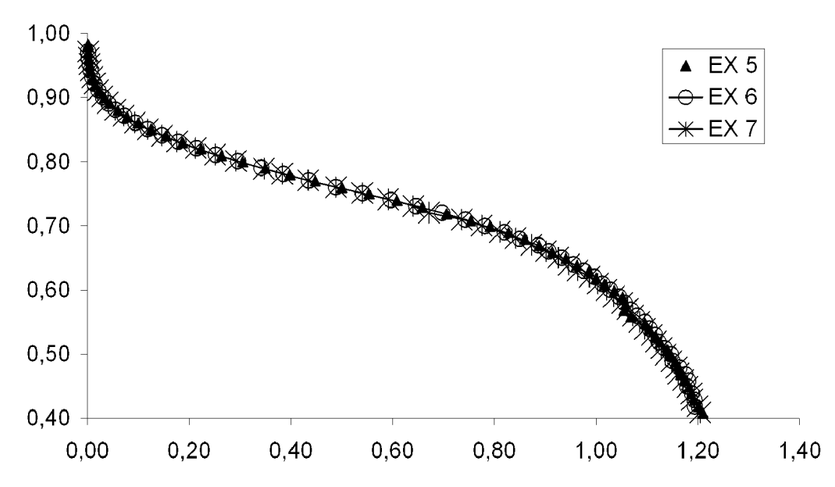

FIG. 1 depicts polarization curves obtained in example 5 (membrane from comparative example 2), example 6 (membrane from comparative example 3) and in example 7 (membrane from example 4) according to the invention, as above described. Abscissa represents the current density (A/cm²), while ordinate represents the cell voltage (V).

No significant difference in polarization curves was observed; this confirmed that the stabilization process of the invention did not negatively affect the BOL performances of the membrane in the fuel cell.

Examples 8 to 10

Fuel Cell Durability Tests in OCV (Open Circuit Voltage)

Fuel cells as described in examples 5 to 7, comprising respectively membranes obtained in comparative examples 2, comparative example 3 and example 4 were tested in OCV tests.

During OCV test, the fuel cells were maintained in open circuit conditions in conditions A, as detailed below, by supplying hydrogen and air to the electrodes. Periodically (i.e. every 100 hours) fuel cells operations were briefly switched to conditions B, as detailed below, by interrupting air supply and feeding hydrogen at the anode. In such conditions hydrogen crossover current was determined. A value of hydrogen crossover current greater that 10 mA/cm² was considered as the membrane failure condition. Whereas such breakpoint was not achieved, OCV test resumed in A conditions for a further 100 hours operations time-slot, until failure was detected.

Operating conditions A:
Reactants flows: 500 SCCM Air-500 SCCM Hydrogen (pure hydrogen 5.5 grade)
Reactant humidity level: 50%;
Cell temperature: 70° C.;
Operating pressure: 1.5 Bar Abs;
Load current: 0 Amps;
Operating conditions B:
Reactants flows: 500 SCCM nitrogen on cathode side-500 SCCM Hydrogen on anode side (pure hydrogen 5.5 grade);
Reactant humidity level: 100%;
Cell Temperature: 75° C.;
Operating pressure: 1.5 Bar Abs on anode side, 1 Bara on cathode side;
Cell voltage: 0.42 V;

In example 8, the membrane prepared in comparative example 2, as assembled in the fuel cell described in example 5, failed after 200 hours of test.

In example 9, the membrane prepared in comparative example 3, as assembled in the fuel cell described in example 6, failed after 500 hours of test.

In example 10, the membrane prepared in example 4, as assembled in the fuel cell described in example 7, does not fail within at least 1000 hours of test.

The invention claimed is:

1. A process for stabilizing a semi-crystalline fluoropolymer comprising ion exchange groups, said process comprising:
suspending at least one semi-crystalline fluoropolymer having ion exchange groups (polymer (I)) in at least one fluorinated organic dispersing medium (medium (M)) so as to obtain a dispersion (D) of polymer (I) in said dispersing medium (M);
contacting said dispersion (D) with fluorine under irradiation with U.V. radiation so as to obtain a stabilized polymer,
wherein the polymer (I) comprises:
recurring units derived from at least one ethylenically unsaturated fluorinated monomer comprising at least one fluorine atom; and
a substantial amount of recurring units derived from at least one ethylenically unsaturated functional monomer comprising at least one ion exchange group;
wherein the polymer (I) comprises recurring units derived from at least one fluorinated functional monomer selected from the group consisting of:
(M1) sulfonated perfluoroolefin of formula (M1):

(M1)

wherein n is an integer between 0 and 6, and X' is selected from the group consisting of Cl, Fl, Br, I, —O⁻M⁺, wherein M⁺ is a cation selected among H⁺, NH₄⁺, K⁺, Li⁺, or Na⁺, and mixtures thereof;
(M2) sulfonated perfluorovinylethers of formula (M2):

(M2)

wherein m is an integer between 1 and 10, and X' is selected from the group consisting of Cl, Fl, Br, I, —O⁻M⁺, wherein M⁺ is a cation selected among H⁺, NH₄⁺, K⁺, Li⁺, or Na⁺, and mixtures thereof;
(M3) sulfonated perfluoroalkoxyvinylethers of formula (M3):

(M3)

wherein w is an integer between 0 and 2, RF₁ and RF₂, equal to or different from each other and at each occurrence, are independently —F, —Cl or a C₁₋₁₀ perfluoroalkyl group, optionally substituted with one or more ether oxygens, y is an integer between 0 and 6, and X' is selected from the group consisting of Cl, Fl, Br, I, —O⁻M⁺, wherein M⁺ is a cation selected among H⁺, NH₄⁺, Li⁺, or Na⁺, and mixtures thereof;

(M4) sulfonated aromatic (per)fluoroolefins of formula (M4):

wherein Ar is a $C_{3-15}$ aromatic or heteroaromatic moiety, and X' is selected from the group consisting of Cl, Fl, Br, I, $-O^-M^+$, wherein $M^+$ is a cation selected among $H^+$, $NH_4^+$, $K^+$, $Li^+$, or $Na^+$, and mixtures thereof; and (M5) mixtures thereof.

2. The process according to claim 1, wherein the polymer (I) comprises tetrafluoroethylene (TFE) copolymers comprising recurring units derived from at least one functional per(halo)fluoromonomer selected from the group consisting of the sulfonated perfluorovinylethers of formula (M2), the sulfonated perfluoroalkoxyvinylethers of formula (M3), and mixtures thereof.

3. The process according to claim 1, wherein the polymer (I) is under the form of powder.

4. The process according to claim 3, wherein the polymer (I) has an average particle size from 20 to 200 μm.

5. The process according to claim 1, wherein the medium (M) is selected from the group consisting of:

(1) perfluoropolyethers of formula:

wherein:
X is equal to —F or —$CF_3$;
B and B', equal to or different from each other, are selected from —$CF_3$, —$C_2F_5$ or —$C_3F_7$;
b1' and b2', equal to or different from each other, are independently integers equal to or greater than zero; should b1' and b2' be both different from zero, the different recurring units are generally statistically distributed along the chain;

(2) perfluoropolyethers of formula:

wherein
X is equal to —F or —$CF_3$;
C' and C", equal to or different from each other, are selected from —$CF_3$, —$C_2F_5$ or —$C_3F_7$;
c1', c2' and c3' equal to or different from each other, are independently integers equal to or greater than zero; should at least two of c1', c2' and c3' be different from zero, the different recurring units are generally statistically distributed along the chain;

(3) perfluoropolyethers of formula:

wherein
D and D', equal to or different from each other, are selected from —$CF_3$, —$C_2F_5$ or —$C_3F_7$;
d1' and d2' equal to or different from each other, are independently integers equal to or greater than zero; should d1' and d2' be both different from zero, the different recurring units are generally statistically distributed along the chain; and (4) perfluoropolyethers of formula:

wherein
G and G', equal to or different from each other, are selected from —$CF_3$, —$C_2F_5$ or —$C_3F_7$;
g1', g2', and g'3 equal to or different from each other, are independently integers equal to or greater than zero; generally g2' and g3' being zero; should at least two of g1', g2' and g3' be different from zero, the different recurring units are generally statistically distributed along the chain.

6. A method of making a membrane comprising utilizing the stabilized semi-crystalline fluoropolymer comprising ion exchange groups obtained by the process according to claim 1.

7. A membrane comprising the stabilized semi-crystalline fluoropolymer comprising ion exchange groups obtained by the process according to claim 1.

8. A membrane-electrode assembly (MEA) comprising the stabilized semi-crystalline fluoropolymer comprising ion exchange groups obtained by the process according to claim 1.

9. The process according to claim 1, wherein Ar in the sulfonated aromatic (per)fluoroolefins of formula (M4) is a $C_{3-15}$ perfluorinated aromatic or heteroaromatic moiety.

10. The process according to claim 1, wherein X' in the sulfonated aromatic (per)fluoroolefins of formula (M4) is fluorine.

* * * * *